(12) United States Patent
Kim et al.

(10) Patent No.: US 12,060,111 B2
(45) Date of Patent: Aug. 13, 2024

(54) SIDE SILL FOR VEHICLE

(71) Applicant: POSCO, Pohang-si (KR)

(72) Inventors: Jaehyun Kim, Incheon (KR); Hong-Woo Lee, Incheon (KR); Dong-Yoon Seok, Incheon (KR)

(73) Assignee: POSCO, Pohang-si (KR)

( * ) Notice: Subject to any disclaimer, the term of this patent is extended or adjusted under 35 U.S.C. 154(b) by 260 days.

(21) Appl. No.: 17/639,707

(22) PCT Filed: Jun. 2, 2020

(86) PCT No.: PCT/KR2020/007145
§ 371 (c)(1),
(2) Date: Mar. 2, 2022

(87) PCT Pub. No.: WO2021/060660
PCT Pub. Date: Apr. 1, 2021

(65) Prior Publication Data
US 2022/0289300 A1    Sep. 15, 2022

(30) Foreign Application Priority Data

Sep. 25, 2019 (KR) .................. 10-2019-0118323
Mar. 5, 2020 (KR) .................. 10-2020-0027860

(51) Int. Cl.
*B62D 25/02* (2006.01)
*B62D 21/15* (2006.01)
*B62D 27/02* (2006.01)

(52) U.S. Cl.
CPC ........... *B62D 25/025* (2013.01); *B62D 21/15* (2013.01); *B62D 27/023* (2013.01)

(58) Field of Classification Search
CPC .... B62D 25/025; B62D 21/15; B62D 21/157; B62D 27/023; B60Y 2306/01
(Continued)

(56) References Cited

U.S. PATENT DOCUMENTS

2002/0043821 A1    4/2002   Takashima et al.
2013/0009424 A1    1/2013   Herntier
(Continued)

FOREIGN PATENT DOCUMENTS

CN    104249214 A    12/2014
CN    104648492 A    5/2015
(Continued)

OTHER PUBLICATIONS

Office Action issued Oct. 25, 2023 for counterpart Chinese Patent Application No. 202080066148.9 (See English Translation).
(Continued)

*Primary Examiner* — Dennis H Pedder
(74) *Attorney, Agent, or Firm* — Morgan, Lewis & Bockius LLP (57) ABSTRACT

The present invention relates to a side sill of a vehicle, the side sill being structurally more robust while having reduced costs and weight. The side sill of a vehicle according to an embodiment comprises: a side sill internal panel; a side sill external panel which is spaced apart from the side sill internal panel; a side sill external reinforcement coupled to the side sill external panel; a partition member arranged between the side sill internal panel and the side sill external reinforcement; a first reinforcing member arranged between the partition member and the side sill internal panel; and a second reinforcing member arranged between the partition member and the side sill external reinforcement.

16 Claims, 9 Drawing Sheets

(58) Field of Classification Search
USPC .......................................... 296/209, 187.12
See application file for complete search history.

(56) References Cited

U.S. PATENT DOCUMENTS

| | | |
|---|---|---|
| 2015/0000956 A1 | 1/2015 | Spinella |
| 2015/0145283 A1 | 5/2015 | Nishino et al. |
| 2016/0229456 A1 | 8/2016 | Boettcher et al. |
| 2017/0203792 A1 | 7/2017 | Sunohara et al. |
| 2017/0297628 A1 | 10/2017 | Iyoshi et al. |
| 2019/0193790 A1 | 6/2019 | Choi et al. |

FOREIGN PATENT DOCUMENTS

| | | | |
|---|---|---|---|
| CN | 105857401 A | | 8/2016 |
| DE | 102011051622 A1 | | 1/2013 |
| JP | H10-244970 A | | 9/1998 |
| JP | 2000-038165 A | | 2/2000 |
| JP | 2004-224097 A | | 8/2004 |
| JP | 2005-153705 A | | 6/2005 |
| JP | 2010-155509 A | | 7/2010 |
| JP | 2012-111246 A | | 6/2012 |
| JP | 2012-111247 A | | 6/2012 |
| JP | 2014-000862 A | | 1/2014 |
| JP | 2015-193362 A | | 11/2015 |
| JP | 2016-128173 A | | 7/2016 |
| JP | 2017-124738 A | | 7/2017 |
| JP | 2018-001890 A | | 1/2018 |
| JP | 2018-114918 A | | 7/2018 |
| KR | 10-1998-0045249 U | | 9/1998 |
| KR | 100364688 B1 | * | 12/2002 |
| KR | 10-2006-0038204 A | | 5/2006 |
| KR | 10-2010-0026124 A | | 3/2010 |
| KR | 10-2011-0134138 A | | 12/2011 |
| KR | 10-2014-0057848 A | | 5/2014 |
| KR | 10-2014-0081609 A | | 7/2014 |
| KR | 10-1482462 B1 | | 1/2015 |
| KR | 101482462 | * | 1/2015 |
| KR | 10-1589937 B1 | | 1/2016 |
| KR | 10-2019-0021800 A | | 3/2019 |
| KR | 10-2019-0029954 A | | 3/2019 |
| KR | 10-2019-0078755 A | | 7/2019 |
| KR | 10-2019-0081043 A | | 7/2019 |

OTHER PUBLICATIONS

Extended European Search Report dated Oct. 10, 2022 issued in European Patent Application No. 20869695.5.
International Search Report dated Sep. 4, 2020 issued in International Patent Application No. PCT/KR2020/007145 (with English translation).

* cited by examiner

SIDE SILL FOR VEHICLE

CROSS-REFERENCE OF RELATED APPLICATIONS

This application is the U.S. National Phase under 35 U.S.C. § 371 of International Patent Application No. PCT/KR2020/007145, filed on Jun. 2, 2020, which in turn claims the benefit of Korean Application Nos. 10-2019-0118323, filed on Sep. 25, 2019 and 10-2020-0027860, filed on Mar. 5, 2020, the entire disclosures of which applications are incorporated by reference herein.

TECHNICAL FIELD

The present disclosure relates to a side sill of a vehicle in which rigidity is reinforced by arranging a reinforcing member inside a side sill internal panel and a side sill external panel.

BACKGROUND ART

In general, a side vehicle body of a vehicle such as an electric vehicle may include a side sill formed to extend in a longitudinal direction of the vehicle in a lower portion thereof, and pillars having one ends coupled to the side sill and the other ends extending in a height direction of the vehicle. The pillars may act as a support for the vehicle body, and the side sill may act as an important vehicle body structure in response to front and side collisions of the vehicle.

The side sill may include a side sill internal panel, a side sill external reinforcement, and a side sill external panel. Here, when an inside of the side sill is empty, buckling is likely to occur under various collision conditions.

Accordingly, the inside of the side sill is reinforced in various ways. For example, a reinforcing member formed by extruding aluminum may be included in the side sill.

However, due to the reinforcing member, a lower end of a B-pillar is difficult to couple to an inner end surface of the side sill, and a direct coupling structure is not formed. For this reason, there may be a problem of insufficient robustness because the end surface of the side sill is structurally weak.

As a related art, there is an invention disclosed in Korean Patent Laid-Open Publication No. 2019-0081043 A.

DISCLOSURE

Technical Problem

An aspect of the present disclosure is to provide a side sill of a vehicle being structurally more robust while having reduced costs and weight.

Technical Solution

An aspect of the present disclosure, a side sill of a vehicle may include: a side sill internal panel; a side sill external panel spaced apart from the side sill internal panel; a side sill external reinforcement coupled to the side sill external panel; a partition member arranged between the side sill internal panel and the side sill external reinforcement; a first reinforcing member arranged between the partition member and the side sill internal panel; and a second reinforcing member arranged between the partition member and the side sill external reinforcement.

Advantageous Effects

According to the present disclosure, it is possible to improve impact absorption performance during a side collision.

In addition, according to the present disclosure, it is possible to improve structural rigidity of a side sill and a pillar or a lower end thereof.

In addition, according to the present disclosure, it is possible to secure cost competitiveness in terms of materials compared to the existing reinforcing member made of aluminum since a reinforcing member of a steel plate may be applied.

BEST MODE

Hereinafter, exemplary embodiments in the present disclosure will be described in detail with reference to the accompanying drawings. It is to be noted that in giving reference numerals to components of the accompanying drawings, the same components will be denoted by the same reference numerals even though they are illustrated in different drawings.

Figure 1:
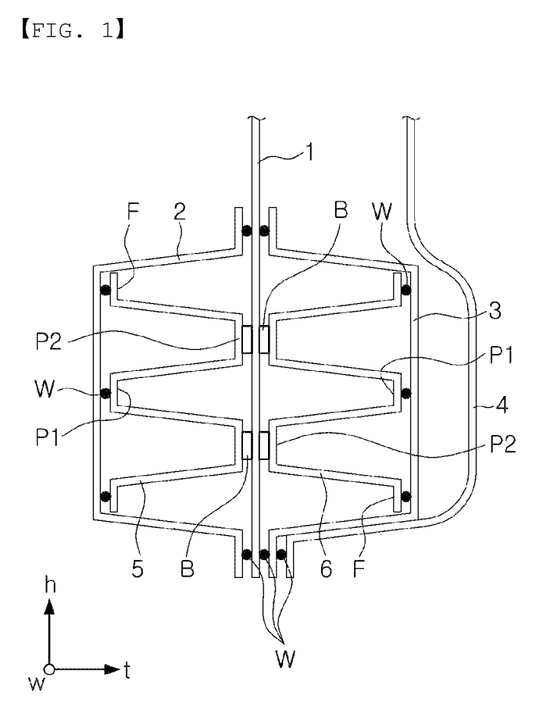
FIG. 1 is a cross-sectional view of a side sill of a vehicle according to a first exemplary embodiment in the present disclosure.
Figure 2:
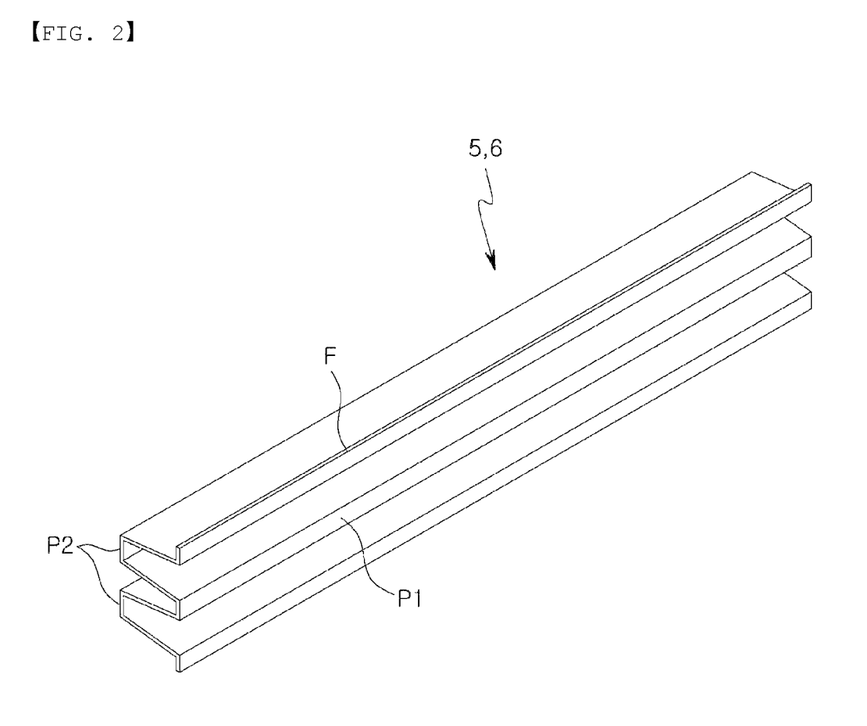
FIG. 2 is a perspective view of a reinforcing member illustrated in FIG. 1.

FIG. 1 is a cross-sectional view of a side sill of a vehicle according to a first exemplary embodiment in the present disclosure, and FIG. 2 is a perspective view of a reinforcing member illustrated in FIG. 1.

The side sill of a vehicle according to the first exemplary embodiment in the present disclosure may include a side sill internal panel 2, a side sill external reinforcement 3, a side sill external panel 4, a partition member, a first reinforcing member 5, and a second reinforcing member 6.

In the first exemplary embodiment in the present disclosure, the partition member may be integrally formed with a pillar internal panel 1 or coupled to the pillar internal panel. In the following description of the first exemplary embodiment, the partition member and the pillar internal panel may be collectively referred to as the pillar internal panel 1 without being distinguished.

Figure 7:
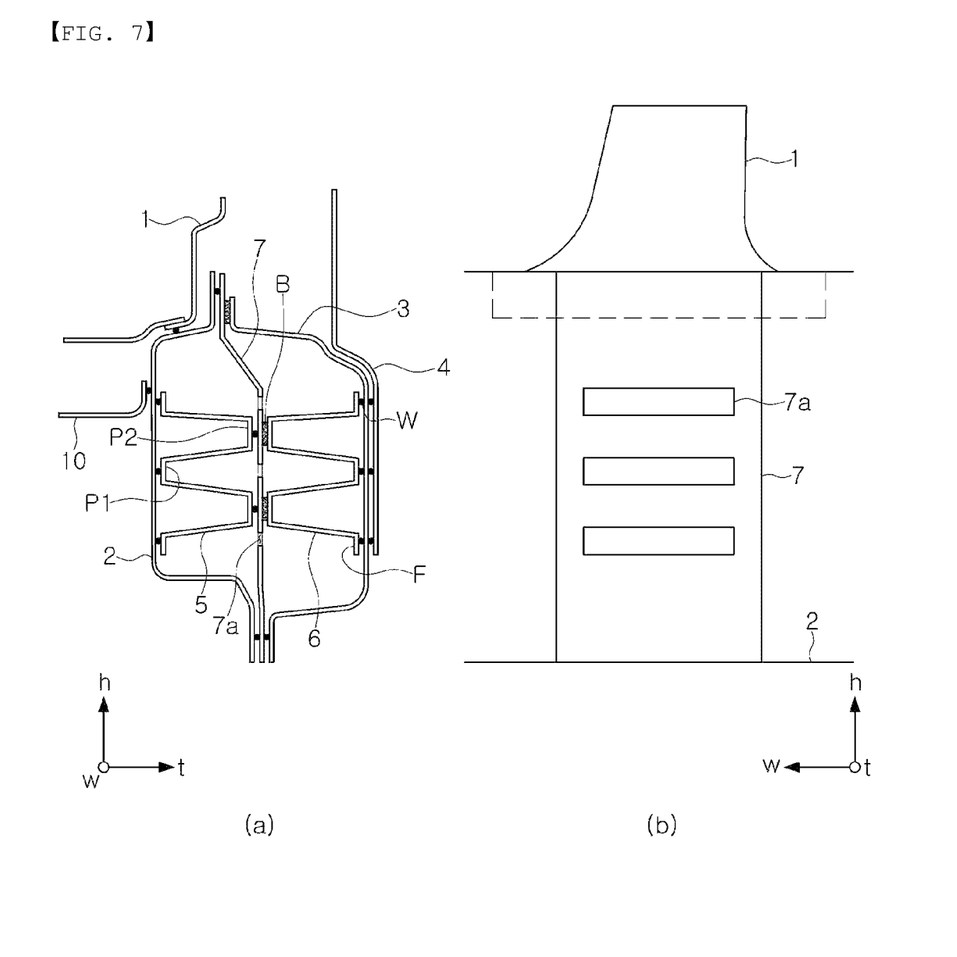
FIG. 7A is a cross-sectional view of a side sill of a vehicle according to a third exemplary embodiment in the present disclosure.
FIG. 7B is a side view of the side sill of a vehicle with some components removed.

For example, a vehicle such as an electric vehicle may include a side sill in a lower portion of a side surface thereof. The side sill may be installed on a vehicle body by coupling the side sill internal panel 2 to, for example, a center floor panel 10 (refer to FIG. 7) or a rear floor panel.

The side sill internal panel 2 may be coupled to one side of the pillar internal panel 1 extending in a height direction h. For example, a B-pillar may include the pillar internal panel.

One side of the side sill external reinforcement 3 may be coupled to the other side of the pillar internal panel 1, and the side sill external panel 4 may be coupled to the other side of the side sill external reinforcement.

The side sill external panel 4 may be spaced apart from the pillar internal panel 1.

In the side sill, the side sill internal panel 2, the pillar internal panel 1, the side sill external reinforcement 3, and the side sill external panel 4 may be welded in three or four plies in lower end portions or upper end portions thereof, and thus, coupled integrally. The 3-ply welding or 4-ply welding will be described below.

In addition, an upper end or a lower end of the side sill may be treated with a sealer (not shown) along a line in a longitudinal direction of the vehicle body to perform sealing.

The side sill of a vehicle according to the first exemplary embodiment in the present disclosure may include a first reinforcing member 5 arranged between the pillar internal panel 1 and the side sill internal panel 2, and a second reinforcing member 6 arranged between the pillar internal panel 1 and the side sill external reinforcement 3.

For example, the first reinforcing member 5 and the second reinforcing member 6 may be formed to have the same shape. As illustrated in FIGS. 1 and 2, the first reinforcing member and the second reinforcing member may have a cross-section that is meanderingly bent.

Specifically, for example, a plate is bent once in a first direction (counterclockwise in FIG. 2) after extending from one end to a predetermined length, and further extends to a predetermined length to form a flat surface P2 and is then bent once more in the same direction. Subsequently, the plate extends to a predetermined length, and is then bent once in a second direction (clockwise in FIG. 2) opposite to the initial bending direction, and further extends to a predetermined length to form a flat surface P1, and is then bent once again in the opposite direction to the initial bending direction.

As described above, a way to extend the plate to the predetermined length and bend the plate is repeated to form a desired number of flat surfaces, and then the plate is terminated at the other end. Thereafter, both ends of the plate may be bent in a clockwise or counterclockwise direction, respectively, to form a flange (F).

Here, extension lengths of the flat surfaces P1 and P2 and the flange F may preferably have a range of about 10 to 15 mm in consideration of a bonding part such as a welding part W formed by welding or an adhesive part B formed by application of an adhesive. In addition, an interior angle in the bent portion may have a range of about 90° to 120°.

The first reinforcing member 5 and the second reinforcing member 6 may have a length sufficient to almost fill the inside of the side sill in the longitudinal direction of the vehicle body.

Since the first reinforcing member 5 and the second reinforcing member 6 have a shape that is bent several times, it is possible to secure the rigidity of the side sill against not only the impact energy acting laterally, but also the impact energy acting forward and backward.

Also, the first reinforcing member 5 and the second reinforcing member 6 may be arranged symmetrically with respect to the pillar internal panel 1.

To this end, the first reinforcing member 5 and the second reinforcing member 6 may have a length in a width direction of the vehicle body that may divide a space between the side sill internal panel 2 and the side sill external reinforcement 3.

The flat surfaces P1 and P2 and the flange F of the first reinforcing member 5 may be bonded to the pillar internal panel 1 and the side sill internal panel 2, respectively, by the welding, the adhesive, or the like. Therefore, the welding part W or the adhesive part B may be formed on the flat surfaces P1 and P2 and the flange F.

The flat surfaces P1 and P2 and the flange F of the second reinforcing member 6 may be bonded to the pillar internal panel 1 and the side sill external reinforcement 3, respectively, by the welding, the adhesive, or the like. Therefore, the welding part W or the adhesive part B may be formed on the flat surfaces P1 and P2 and the flange F.

As described above, the side sill of a vehicle according to the first exemplary embodiment in the present disclosure may be coupled to the internal panel of the pillar such as the B-pillar so as not to reduce the structural rigidity of the cross section of the side sill.

Furthermore, by employing two reinforcing members having the same shape as the side sill of a vehicle according to the first exemplary embodiment in the present disclosure, it is possible to significantly reduce costs required for, for example, a mold.

Figure 3:
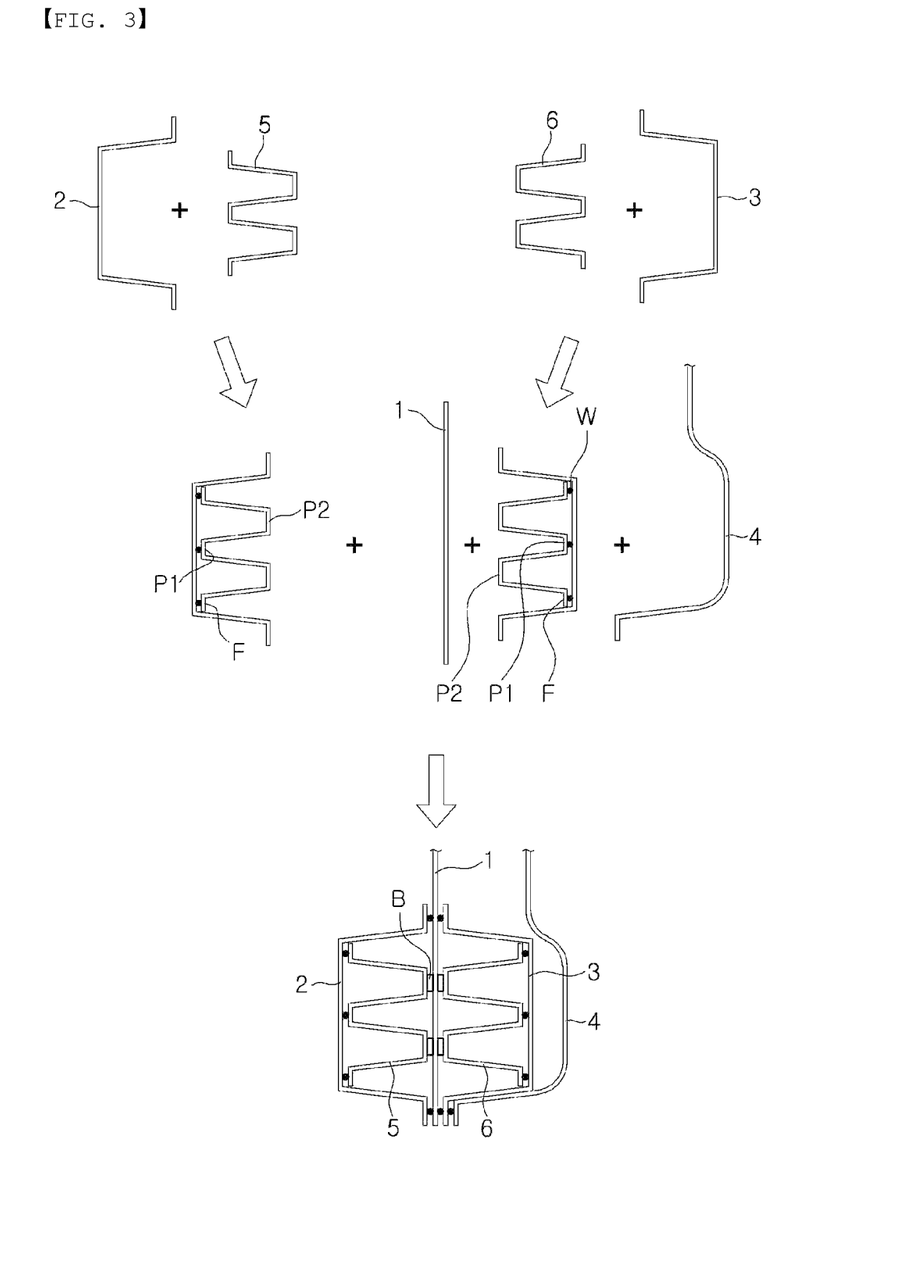
FIG. 3 is a diagram illustrating a method of assembling a side sill of a vehicle according to the first exemplary embodiment in the present disclosure.

FIG. 3 is a diagram illustrating a method of assembling a side sill of a vehicle according to the first exemplary embodiment in the present disclosure.

The vehicle body is assembled by coupling an under body assembly and a side structure assembly. Here, the side sill internal panel 2 may be included in the under body assembly, and the pillar internal panel 1, the side sill external reinforcement 3, the side sill external panel 4, and the like may be included in the side structure assembly.

In the vehicle side sill according to the first exemplary embodiment in the present disclosure, the first reinforcing member 5 may be coupled to the under body assembly, that is, the side sill internal panel 2, and the second reinforcing member 6 may be assembled to the side structure assembly.

In particular, the second reinforcing member 6 may be coupled to the side sill external reinforcement 3 before being coupled to the pillar internal panel 1. In this case, the second reinforcing member may be coupled to the side sill external reinforcement by, for example, spot welding or the like, and the welding part W may be formed between the flange F and the flat surface P1 of the second reinforcing member and an inner surface of the side sill external reinforcement.

When the pillar internal panel 1 is coupled to the second reinforcing member 6, one side of the second reinforcing member may be shielded, making it difficult to perform normal bidirectional spot welding. As a result, the flat surface P2 of the second reinforcing member may be bonded to one side of the pillar internal panel using unidirectional spot welding or a structural adhesive. FIG. 3 illustrates an example in which an adhesive part B is formed using an adhesive.

Subsequently, the pillar internal panel 1, the side sill external reinforcement 3, and the side sill external panel 4 may be welded in three plies in the lower end portions or upper end portions thereof. Alternatively/simultaneously, as will be described later, the pillar internal panel 1, the side sill external reinforcement 3, and the side sill external panel 4 may be welded in four plies together with the side sill internal panel 2 in the lower end portions or upper end portions thereof, and thus, coupled integrally.

On the other hand, the first reinforcing member 5 on the underbody assembly side may be welded to the side sill internal panel 2 by bidirectional spot welding, so that the welding part W may be formed between the flange F and flat surface P1 of the first reinforcing member and the inner surface of the side sill internal panel.

When the under body assembly in which the first reinforcing member 5 is assembled is coupled to the side structure assembly in which the second reinforcing member 6 is assembled, the flat surface P2 of the first reinforcing member may be bonded to the pillar internal panel using the unidirectional spot welding or structural adhesive to the pillar internal panel 1 and the first reinforcing member 5.

Finally, the side sill internal panel 2, the pillar internal panel 1, the side sill external reinforcement 3, and the side sill external panel 4 may be integrally and structurally stably coupled in four plies in the lower end portions or upper end portions thereof.

Accordingly, the coupling between the under body assembly and the side structure assembly is completed.

Figure 4:
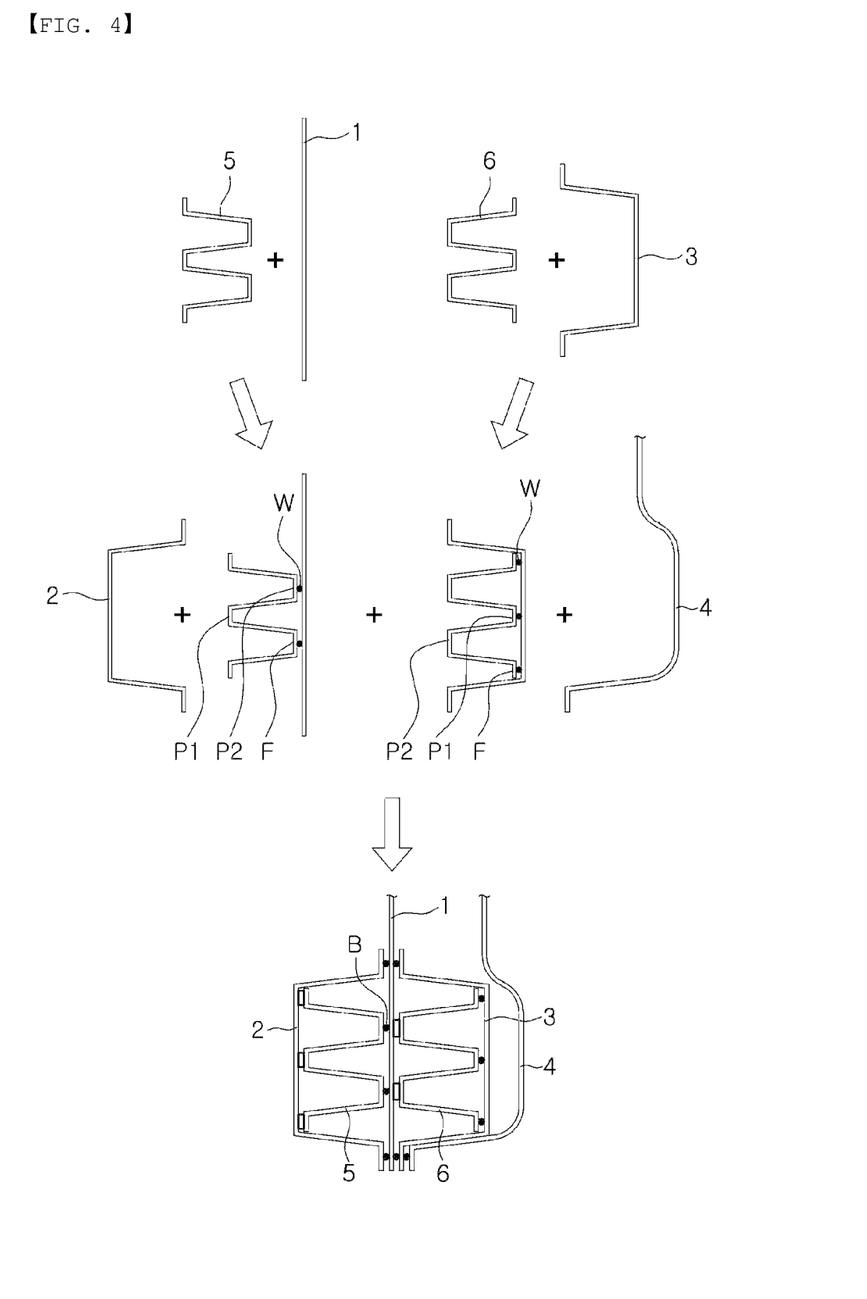
FIG. 4 is a diagram illustrating another method of assembling a side sill of a vehicle according to the first exemplary embodiment in the present disclosure.

FIG. 4 is a diagram illustrating another method of assembling a side sill of a vehicle according to the first exemplary embodiment in the present disclosure.

Another assembling method illustrated in FIG. 4 is different from the method of assembling an under body assembly side, and the rest of the assembling method is the same as the assembling method illustrated in FIG. 3. Accordingly, in describing another method of assembling the side sill of a vehicle according to the first exemplary embodiment in the present disclosure, detailed descriptions of the same contents as those of the assembling method described above will be omitted.

In the assembling method described with reference to FIG. 3, since the coupling between the pillar internal panel 1 and the first reinforcing member 5 is performed by the structural adhesive, there may be a risk that the bonding strength may be somewhat weakened.

In order to solve this problem, in another assembling method illustrated in FIG. 4, the first reinforcing member 5 may be first coupled to the pillar internal panel 1. In this case, the first reinforcing member may be coupled to the pillar internal panel by, for example, the bidirectional spot welding, and thus, the welding part W may be formed between the flat surface P2 of the first reinforcing member and the pillar internal panel.

Accordingly, there may be an advantage in that the bonding strength is strengthened in the coupling between the pillar internal panel 1 and the first reinforcing member 5.

Thereafter, the pillar internal panel 1 may be bonded to the second reinforcing member 6 assembled to the side sill external reinforcement 3 using the unidirectional spot welding or structural adhesive B to the flat surface P2 of the second reinforcing member. FIG. 4 illustrates an example in which an adhesive part B is formed using an adhesive.

Even when the first reinforcing member 5 assembled on the opposite side of the second reinforcing member 6 in the pillar internal panel 1 is coupled to the side sill internal panel 2, one side of the first reinforcing member may be shielded. Therefore, since the normal bidirectional spot welding is difficult, the flange F and flat surface P1 of the first reinforcing member and the inner surface of the side sill internal panel may be bonded using the unidirectional spot welding or structural adhesive.

Finally, the side sill internal panel 2, the pillar internal panel 1, the side sill external reinforcement 3, and the side sill external panel 4 may be integrally and structurally, and stably coupled in four plies in the lower end portions or upper end portions thereof.

Accordingly, the coupling between the under body assembly and the side structure assembly is completed.

Figure 5:
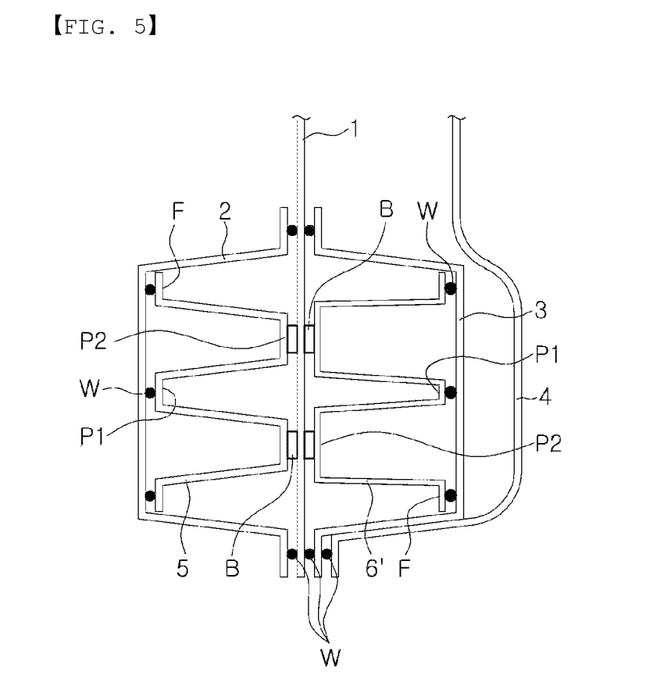
FIG. 5 is a cross-sectional view of a side sill of a vehicle according to the second exemplary embodiment in the present disclosure.
Figure 6:
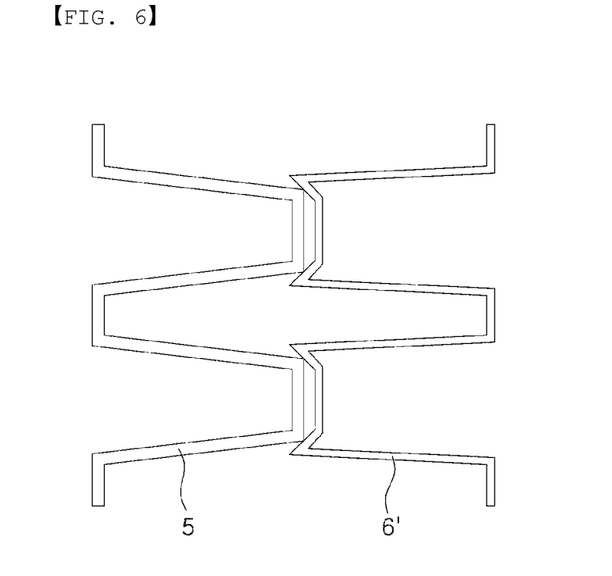
FIG. 6 is a diagram illustrating an operation of the side sill of a vehicle according to the second exemplary embodiment in the present disclosure.

FIG. 5 is a cross-sectional view of a side sill of a vehicle according to a second exemplary embodiment in the present disclosure, and FIG. 6 is a diagram illustrating an operation of the side sill of a vehicle according to the second exemplary embodiment in the present disclosure.

The side sill of a vehicle according to the second exemplary embodiment in the present disclosure may include a side sill internal panel 2, a side sill external reinforcement 3, a side sill external panel 4, a partition member, a first reinforcing member 5, and a second reinforcing member 6'.

In the second exemplary embodiment in the present disclosure, the partition member may be integrally formed with a pillar internal panel 1 or coupled to the pillar internal panel. In the following description of the second exemplary embodiment, the partition member and the pillar internal panel may be collectively referred to as the pillar internal panel 1 without being distinguished.

In addition, in the second exemplary embodiment in the present disclosure, only the second reinforcing member 6' provided between the pillar internal panel 1 and the side sill external reinforcement 3 may be different, and the remaining components may be the same as those of the first exemplary embodiment illustrated and described in FIGS. 1 to 4. Therefore, in describing the side sill of a vehicle according to the second exemplary embodiment in the present disclosure, the same components as those of the side sill of a vehicle according to the first exemplary embodiment will be denoted by the same reference numerals, and a detailed description for configurations and functions of these components will be omitted.

The side sill of a vehicle according to the second exemplary embodiment in the present disclosure may be formed so that the pillar internal panel 1, that is, the flat surface P2 of the second reinforcing member 6' adjacent to the partition member has a large size than the flat surface P2 of the corresponding first reinforcing member 5 with respect to the pillar internal panel.

Accordingly, the first reinforcing member 5 and the second reinforcing member 6 may be formed in slightly different shapes.

In addition, the thickness or strength of the second reinforcing member 6' provided between the pillar internal panel 1 and the side sill external reinforcement 3 may be thinner or lower than that of the first reinforcing member 5 provided between the pillar internal panel 1 and the side sill internal panel 2.

With this configuration, as illustrated in FIG. 6, the outer second reinforcing member 6' may be deformed first during the lateral collision, and accordingly, a behavior in which the inner first reinforcing member 5 may exhibit a behavior of being inserted into the deformed space of the second reinforcing member may be shown.

Accordingly, there may be an advantage in that the side sill of a vehicle according to the second exemplary embodiment in the present disclosure absorbs the collision energy step by step while the second reinforcing member 6' and the first reinforcing member 5 are doubly collapsing, thereby exhibiting the excellent collision energy absorption ability.

Here, it goes without saying that the assembling methods described with reference to FIGS. 3 and 4 may be equally applied to the side sill of a vehicle according to the second exemplary embodiment in the present disclosure.

FIG. 7A is a cross-sectional view of a side sill of a vehicle according to a third exemplary embodiment in the present disclosure, and FIG. 7B is a side view of the side sill of a vehicle with some components removed.

The side sill of a vehicle according to the third exemplary embodiment in the present disclosure may include a side sill internal panel 2, a side sill external reinforcement 3, a side sill external panel 4, a partition member 7, a first reinforcing member 5, and a second reinforcing member 6.

In the third exemplary embodiment in the present disclosure, only the coupling relationship and arrangement relationship between the partition member 7 and the separated pillar internal panel 1 are different, and the remaining components are the same as those of the first exemplary embodiment illustrated and described in FIGS. 1 to 4. Therefore, in describing the side sill of a vehicle according to the third exemplary embodiment in the present disclosure, the same components as those of the side sill of a vehicle according to the first exemplary embodiment will be denoted by the same reference numerals, and a detailed description for configurations and functions of these components will be omitted.

The side sill internal panel 2 may be coupled to a part of the pillar internal panel 1 extending in a height direction h. For example, a B-pillar may include the pillar internal panel.

The side sill external panel 4 may be spaced apart from the pillar internal panel 1.

In addition, the side sill external panel 4 may be coupled to a part of the side sill external reinforcement 3.

The partition member 7 may be arranged to partition the inner space of the side sill into two spaces while being interposed between the side sill internal panel 2 and the side sill external reinforcement 3. Such a partition member may be formed of, for example, a metal plate, such as a steel plate.

The partition member 7 may be bent or curved in the thickness direction (t; for example, the width direction of the vehicle body).

The partition member 7 may have at least one welding through-hole 7a extending in the width direction (w; for example, the longitudinal direction of the vehicle body). For example, a spot welder or the like penetrates through the welding through-hole, and thus, the first reinforcing member 5 to be described later and the side sill internal panel 2 may be bonded by welding.

In the side sill, the side sill internal panel 2, the partition member 7, the side sill external reinforcement 3, and the side sill external panel 4 may be welded in three or four plies in the lower end portions or upper end portions thereof, and thus, coupled integrally.

The side sill of a vehicle according to the third exemplary embodiment in the present disclosure may include the first reinforcing member 5 arranged between the partition member 7 and the side sill internal panel 2, and the second reinforcing member 6 arranged between the partition member 7 and the side sill external reinforcement 3.

For example, the first reinforcing member 5 and the second reinforcing member 6 may be formed to have the same shape. As illustrated in FIGS. 7 and 2, the first reinforcing member and the second reinforcing member may have a cross-section that is meanderingly bent.

The first reinforcing member 5 and the second reinforcing member 6 may have a length sufficient to almost fill the inside of the side sill in the longitudinal direction of the vehicle body.

Since the first reinforcing member 5 and the second reinforcing member 6 have a shape that is bent several times, it is possible to secure the rigidity of the side sill against not only the impact energy acting laterally, but also the impact energy acting forward and backward.

For example, the first reinforcing member 5 and the second reinforcing member 6 may be arranged symmetrically with respect to the partition member 7.

To this end, the first reinforcing member 5 and the second reinforcing member 6 may have a length in a width direction of the vehicle body that may divide a space between the side sill internal panel 2 and the side sill external reinforcement 3.

The flat surfaces P1 and P2 and the flange F of the first reinforcing member 5 may be bonded to the partition member 7 and the side sill internal panel 2 by the welding or the like. Therefore, the welding part W may be formed on the flat surfaces P1 and P2 and the flange F. However, the present disclosure is not necessarily limited thereto, and if necessary, an adhesive may be applied instead of welding to form an adhesive part (B), so the bonding may be made.

The flat surfaces P1 and P2 and the flange F of the second reinforcing member 6 may be bonded to the partition member 7 and the side sill internal panel 3 by the welding, the adhesive, or the like. Therefore, the welding part W or the adhesive part B may be formed on the flat surfaces P1 and P2 and the flange F.

As described above, the side sill of a vehicle according to the third exemplary embodiment in the present disclosure may be coupled to the internal panel of the pillar such as the B-pillar so as not to reduce the structural rigidity of the cross section of the side sill, and may include the partition member acting as the reinforcing member.

Furthermore, by employing two reinforcing members having the same shape as the side sill of a vehicle according to the third exemplary embodiment in the present disclosure, it is possible to significantly reduce costs required for, for example, a mold.

Figure 8:
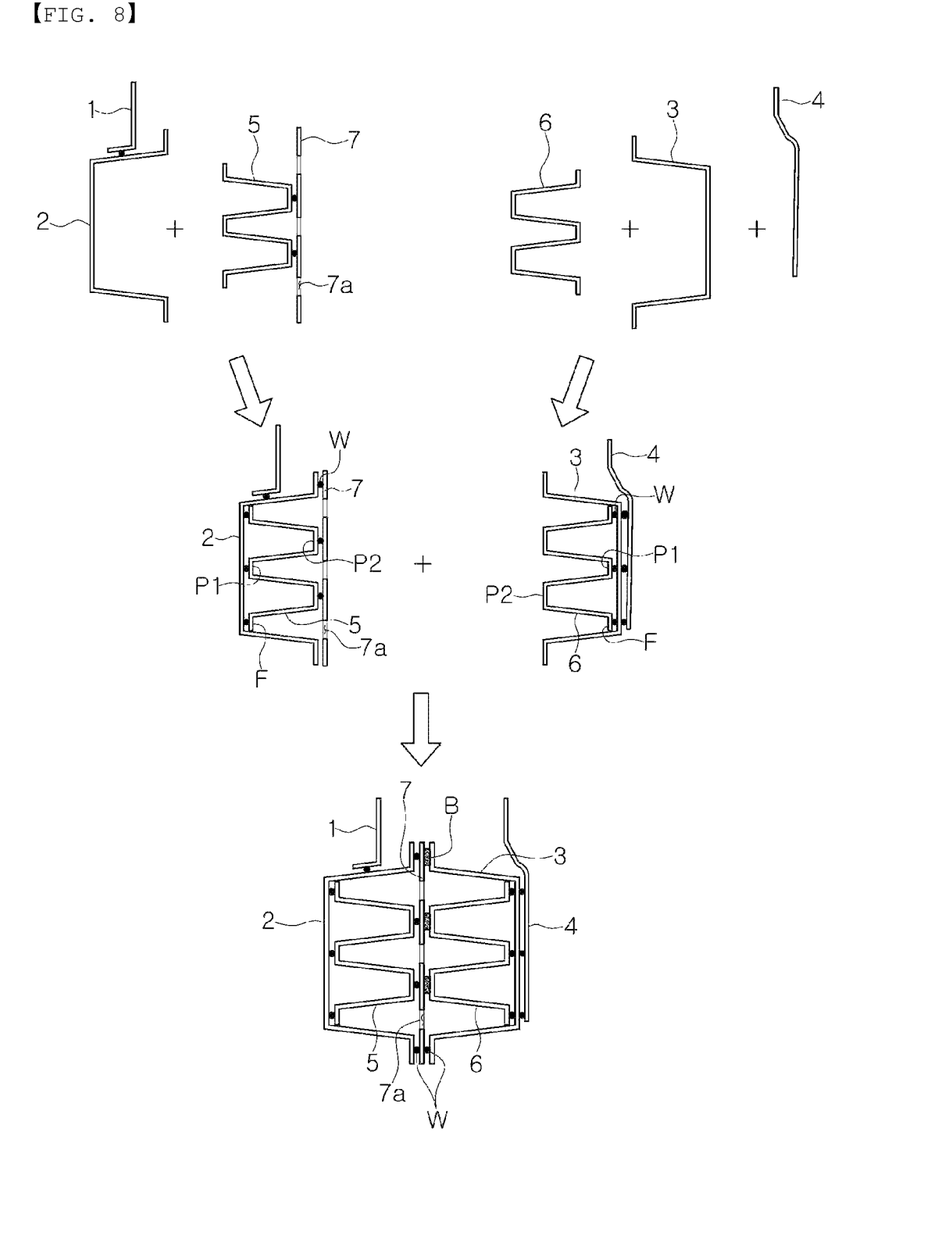
FIG. 8 is a diagram illustrating a method of assembling a side sill of a vehicle according to the third exemplary embodiment in the present disclosure.

FIG. 8 is a diagram illustrating a method of assembling a side sill of a vehicle according to a third exemplary embodiment in the present disclosure.

As described above, the vehicle body is assembled by coupling an under body assembly and a side structure assembly. Here, the side sill internal panel 2 may be included in the under body assembly, and the side sill external reinforcement 3, the side sill external panel 4, and the like may be included in the side structure assembly.

In the vehicle side sill according to the third exemplary embodiment in the present disclosure, the first reinforcing member 5 may be coupled to the under body assembly, that is, the side sill internal panel 2 together with the partition member 7, and the second reinforcing member 6 may be assembled to the side structure assembly.

In particular, the second reinforcing member 6 may be coupled to the side sill external reinforcement 3 before being coupled to the partition member 7. In this case, the second reinforcing member may be coupled to the side sill external reinforcement by, for example, the spot welding or the like, and the welding part W may be formed between the flange F and the flat surface P1 of the second reinforcing member and an inner surface of the side sill external reinforcement 3.

As illustrated in FIG. 8, when the lower end of the side sill external panel 4 does not extend to the lower end of the side sill external reinforcement 3, the side sill external panel 4 may be welded in three plies at positions corresponding to the flange F and the flat surface P1 of the second reinforcing member when the second reinforcing member 6 is coupled the side sill external reinforcement 3.

When the partition member 7 is coupled to the second reinforcing member 6, one side of the partition member may be shielded or one side of the second reinforcing member may be shielded, making it difficult to perform the normal bidirectional spot welding. As a result, the flat surface P2 of the second reinforcing member may be bonded to one side of the partition member using the unidirectional spot welding or structural adhesive. FIG. 8 illustrates an example in which an adhesive part B is formed using an adhesive.

Subsequently, the partition member 7 and the side sill external reinforcement 3 may be welded in three plies together with the side sill internal panel 2 in the lower end portions thereof, and thus, coupled integrally.

On the other hand, the partition member and the side sill external reinforcement may be bonded to each other using the unidirectional spot welding or structural adhesive in the upper end portions thereof. FIG. 8 illustrates an example in which an adhesive part B is formed using an adhesive.

Meanwhile, the first reinforcing member 5 on the under body assembly side may be first coupled to the partition member 7. The first reinforcing member may be coupled to the partition member by, for example, the bidirectional spot welding or the like, and thus, the welding part W may be formed between the flat surface P2 of the first reinforcing member and the other side of the partition member.

Accordingly, there may be an advantage in that the bonding strength between the partition member 7 and the first reinforcing member 5 is strengthened.

In addition, the side sill internal panel 2 and the pillar internal panel 1 may be bonded to each other by the spot welding or the like. For example, the welding part W may be formed between an inclined surface of the side sill internal panel and an end portion of the pillar internal panel.

Thereafter, when the assembly including the partition member 7 and the first reinforcing member 5 are coupled to the side sill internal panel 2 coupled to the pillar internal panel 1, the bidirectional spot welding between the first reinforcing member and the side sill internal panel may be performed by using the welding through-hole 7a formed in the partition member. Accordingly, the welding part W may be formed between the flange F and/or the flat surface P1 of the first reinforcing member and the inner surface of the side sill internal panel.

Then, the partition member 7 and the side sill internal panel 2 may be bonded to each other by the spot welding or the like in the upper end portions thereof.

When coupling the under body assembly in which the first reinforcing member 5 is assembled and the side structure assembly in which the second reinforcing member 6 is assembled, as described above, by using the unidirectional spot welding or structural adhesive, the flat surface P2 of the second reinforcing member is bonded to one side of the partition member 7, and the upper end portions of the partition member and the side sill external reinforcement 3 may be bonded to each other.

Finally, the partition member 7 and the side sill external reinforcement 3 and the side sill internal panel 2 may be welded in three plies in the lower end portions thereof, and thus, coupled integrally and structurally stably.

Accordingly, the coupling between the under body assembly and the side structure assembly is completed.

Figure 9:
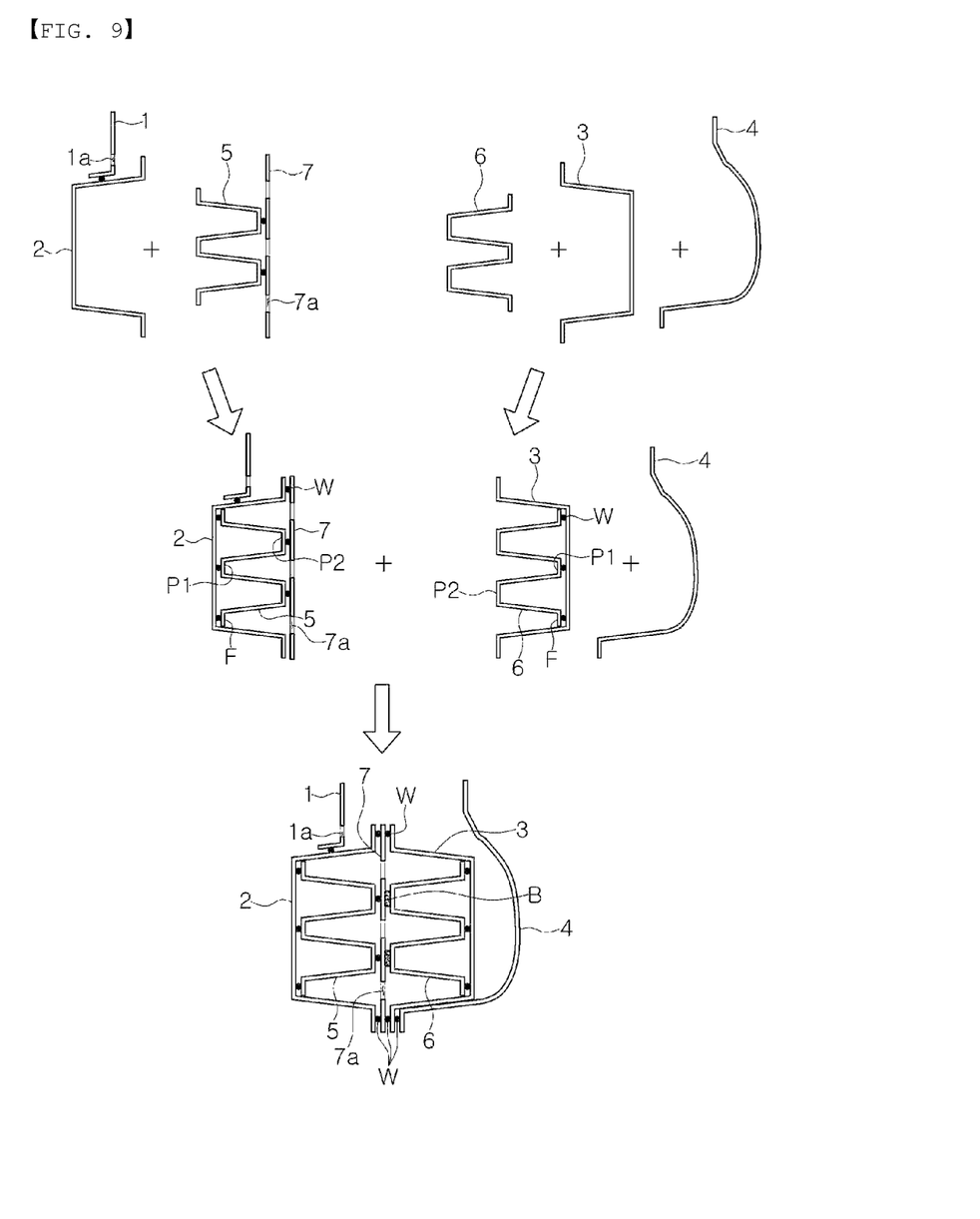
FIG. 9 is a diagram illustrating another method of assembling a side sill of a vehicle according to the third exemplary embodiment in the present disclosure.

FIG. 9 is a diagram illustrating another method of assembling a side sill of a vehicle according to the third exemplary embodiment in the present disclosure.

Another assembling method illustrated in FIG. 9 is different from the method of assembling a side sill external panel on a side structure assembly side, and the rest of the assembling method is the same as the assembling method illustrated in FIG. 8 as described above. Accordingly, in describing another method of assembling the side sill of a vehicle according to the third exemplary embodiment in the present disclosure, detailed descriptions of the same contents as those of the assembling method described above will be omitted.

As illustrated in FIG. 9, when the lower end of the side sill external panel 4 extends to the lower end of the side sill external reinforcement 3, the side sill external panel may be welded in four plies together with the partition member 7 and the side sill external reinforcement and the side sill internal panel 2 in the lower end portions thereof.

Similarly, when coupling the partition member 7 and the second reinforcing member 6, since the normal bidirectional spot welding is difficult, the flat surface P2 of the second reinforcing member may be bonded to one side of the partition member using the unidirectional spot welding or structural adhesive. FIG. 9 illustrates an example in which an adhesive part B is formed using an adhesive.

The partition member 7 and the side sill external reinforcement 3 may be bonded to each other using the unidirectional spot welding or structural adhesive in the upper end portions thereof.

Alternatively, for example, a through-hole 1a for welding may be formed in the pillar internal panel 1 coupled with the side sill internal panel 2. In this case, for example, a spot welder or the like penetrates through the through-hole for welding so that the partition member 7 and the side sill external reinforcement 3 and the side sill internal panel 2 may be welded in three plies in the upper end portions thereof.

Of course, the partition member 7, the side sill external reinforcement 3, and the side sill internal panel 2 may be welded in four plies together with the side sill external panel (4) in the lower end portions thereof as described above, and thus, coupled integrally and structurally stably.

Accordingly, the coupling between the under body assembly and the side structure assembly is completed.

Figure 10:
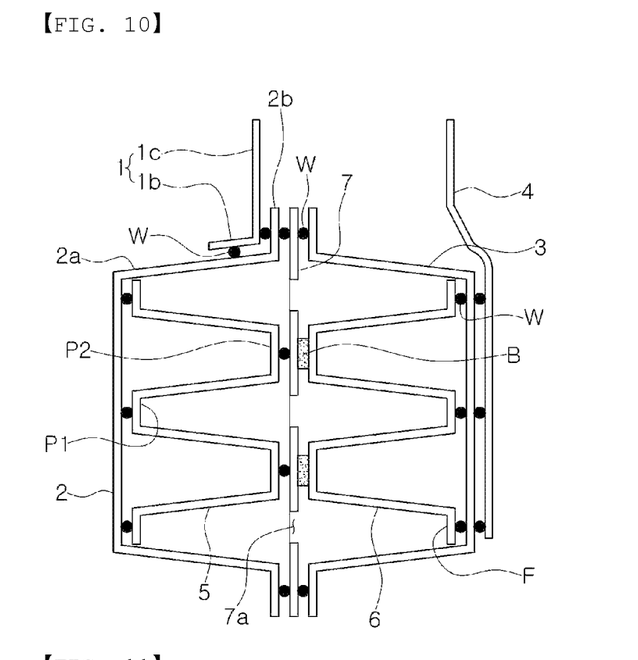
FIG. 10 is a diagram illustrating still another method of assembling a side sill of a vehicle according to the third exemplary embodiment in the present disclosure.

FIG. 10 is a diagram illustrating still another method of assembling a side sill of a vehicle according to the third exemplary embodiment in the present disclosure.

Another assembling method illustrated in FIG. 10 is different from only the method of assembling an under body assembly side and the coupling relationship of the partition member, the side sill external reinforcement, and the side sill internal panel in the upper portions thereof, and the rest of the assembling method is the same as the assembling method illustrated in FIG. 8 described above. Accordingly, in describing another method of assembling the side sill of a vehicle according to the third exemplary embodiment in the present disclosure, detailed descriptions of the same contents as those of the assembling method described above will be omitted.

As illustrated in FIG. 10, the side sill internal panel 2 and the pillar internal panel 1 may be bonded to each other by the spot welding or the like. For example, a welding part W may be formed between the an inclined surface 2a of the side sill internal panel and end portion 1b of the pillar internal panel and between the flange 2b of the side sill internal panel and the side wall 1c of the pillar internal panel.

By doubly forming the welding part W in this way, there may be an advantage in that the bonding strength is strengthened in the bonding between the pillar internal panel 1 and the side sill internal panel 2.

To this end, the welding part W may be first formed between the inclined surface 2a of the side sill internal panel 2 and the end portion 1b of the pillar internal panel 1 by the spot welding or the like.

Thereafter, the assembly including the partition member 7 and the first reinforcing member 5 may be coupled to the side sill internal panel 2 coupled to the pillar internal panel 1. As described above, the welding part W may be formed between the flange F and/or the flat surface P1 of the first reinforcing member and the inner surface of the side sill internal panel.

When the under body assembly in which the first reinforcing member 5 is assembled is coupled to the side structure assembly in which the second reinforcing member 6 is assembled, by using the unidirectional spot welding or the structural adhesive, the flat surface P2 of the second reinforcing member may be bonded to one side of the partition member 7. FIG. 10 illustrates an example in which an adhesive part B is formed using an adhesive.

Finally, the partition member 7 and the side sill external reinforcement 3 and the side sill internal panel 2 may be welded in three plies in the lower end portions thereof, while the partition member 7 and the side sill external reinforcement 3 and the side sill internal panel 2 may be welded in four plies together with the pillar internal panel 1 in the upper end portion, and thus, coupled integrally and structurally stably.

Accordingly, the coupling between the under body assembly and the side structure assembly is completed.

Figure 11:
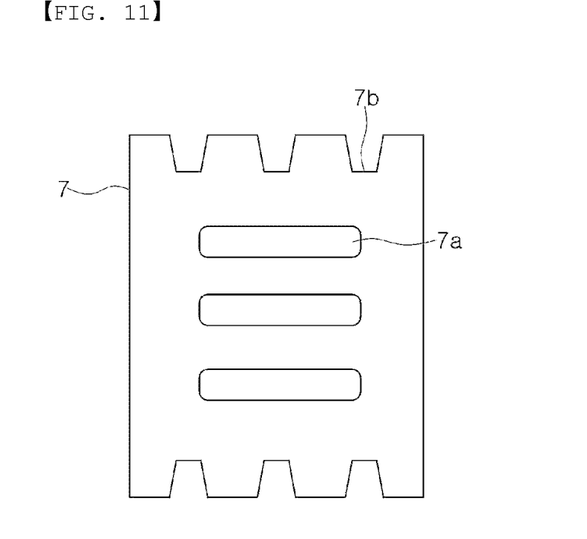
FIG. 11 is a side view illustrating a modified example of a partition member that may be used in the assembling method of FIG. 9 or 10.

FIG. 11 is a side view illustrating a modified example of a partition member that may be used in the assembling method of FIG. 9 or 10.

As illustrated, a plurality of through grooves 7b for welding recessed from a front end toward a center may be formed at the upper end or lower end of the partition member 7.

In the assembling method of FIG. 9 or 10, there may be a risk that the bonding strength is somewhat weakened because the bonding is made by four-ply welding if necessary.

In order to solve this problem, a through groove 7b for welding may be formed in the upper end or lower end of the partition member 7, and thus, three-ply welding may be applied in the portion to be welded in four plies together with the partition member.

For example, in FIG. 9, when the side sill external panel 4 is to be welded in 4 plies together with the partition member 7 and the side sill external reinforcement 3 and the side sill internal panel 2 in the lower end portion thereof, the plurality of through grooves 7b for welding may be formed in the lower end of the partition member, and thus, the welding of the partition member may be avoided, so the 3-ply welding may be made between the side sill external panel 4 and the side sill external reinforcement 3 and the side sill internal panel 2.

In addition, in FIG. 10, when the partition member 7 and the side sill external panel 3 and the side sill internal panel 2 are to be welded in four plies together with the pillar internal panel 1 in the upper end portions thereof, the plurality of through grooves 7b for welding may be formed in the upper end of the partition member, and thus, the welding of the partition member may be avoided, so the 3-ply welding may be made between the side sill external reinforcement 3 and the side sill internal panel 2 and the pillar internal panel 1.

By performing the three-ply welding instead of the four-ply welding, there may be an advantage in that the coupling between the under body assembly and the side structure assembly may be made integrally and structurally more stably.

According to the side sill of a vehicle according to the present disclosure, two reinforcing members installed in the side sill may protect passengers and batteries in case of a side collision, and at the same time, it is possible to provide a structurally more robust side sill.

The spirit of the present disclosure has been illustratively described hereinabove. It will be appreciated by those skilled in the art that various modifications and alterations may be made without departing from the essential characteristics of the present disclosure.

For example, the above-described assembling methods of the present disclosure may be combined with each other, and each assembling method may employ some components of other assembling methods.

Accordingly, exemplary embodiments disclosed in the present disclosure are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

INDUSTRIAL APPLICABILITY

As described above, the present disclosure is useful for constructing a side vehicle body of a vehicle.

The invention claimed is:
1. A side sill of a vehicle, comprising:
a side sill internal panel;
a side sill external panel spaced apart from the side sill internal panel;
a side sill external reinforcement coupled to the side sill external panel;
a partition member arranged between the side sill internal panel and the side sill external reinforcement;
a first reinforcing member arranged between the partition member and the side sill internal panel; and
a second reinforcing member arranged between the partition member and the side sill external reinforcement,
wherein the first reinforcing member and the second reinforcing member have a cross-section that is corrugated,
wherein the first reinforcing member and/or the second reinforcing member has a plurality of flat surfaces and flanges, and welding parts or adhesive parts are formed on the flat surfaces and the flanges, and wherein a flat surface of the second reinforcing member adjacent to the partition has a larger size than a flat surface of the corresponding first reinforcing member with respect to the partition member.

2. The side sill of a vehicle of claim 1, wherein the first reinforcing member and the second reinforcing member are arranged symmetrically with respect to the partition member.

3. The side sill of a vehicle of claim 1, wherein the partition member is integrally formed with a pillar internal panel or is coupled to the pillar internal panel.

4. The side sill of a vehicle of claim 3, wherein a welding part is formed between the second reinforcing member and the side sill external reinforcement, and
a welding part or an adhesive part is formed between the second reinforcing member and the pillar internal panel.

5. The side sill of a vehicle of claim 4, wherein a welding part is formed between the first reinforcing member and the side sill internal panel, and
a welding part or an adhesive part is formed between the first reinforcing member and the pillar internal panel.

6. The side sill of a vehicle of claim 4, wherein a welding part is formed between the first reinforcing member and the pillar internal panel, and
a welding part or an adhesive part is formed between the first reinforcing member and the side sill internal panel.

7. The side sill of a vehicle of claim 3, wherein the side sill internal panel, the pillar internal panel, the side sill external reinforcement, and the side sill external panel are welded in three or four plies in a lower end portion or an upper end portion.

8. The side sill of a vehicle of claim 1, wherein a thickness or strength of the second reinforcing member is thinner or lower than that of the first reinforcing member.

9. The side sill of a vehicle of claim 1, wherein a pillar internal panel is coupled to the side sill internal panel, and
at least one through-hole for welding is formed in the partition member.

10. The side sill of a vehicle of claim 9, wherein a through-hole for welding is formed in the pillar internal panel, and
the side sill internal panel, the partition member, and the side sill external reinforcement are welded in three plies in an upper end portion.

11. The side sill of a vehicle of claim 9, wherein a plurality of through grooves for welding are formed in the partition member to be recessed from a front end toward a center.

12. The side sill of a vehicle of claim 9, wherein a welding part is formed between the second reinforcing member and the side sill external reinforcement, and
a welding part or an adhesive part is formed between the second reinforcing member and the partition member.

13. The side sill of a vehicle of claim 9, wherein a welding part is formed between the first reinforcing member and the side sill internal panel, and
a welding part or an adhesive part is formed between the first reinforcing member and the partition member.

14. The side sill of a vehicle of claim 9, wherein the side sill internal panel, the partition member, and the side sill external reinforcement are welded in three plies in a lower end portion.

15. The side sill of a vehicle of claim 9, wherein the side sill internal panel, the partition member, the side sill external reinforcement, and the side sill external panel are welded in four plies in a lower end portion.

16. The side sill of a vehicle of claim 11, wherein the side sill internal panel, the partition member, the side sill external reinforcement, and the side sill external panel are welded in three plies in a lower end portion.

* * * * *